(12) United States Patent
Anand et al.

(10) Patent No.: US 11,009,848 B2
(45) Date of Patent: May 18, 2021

(54) SCALABLE INTELLIGENT QUERY-BASED INTERFACE TO NAVIGATE AND FIND INDUSTRIAL INFORMATION ON A VISUAL INTERFACE

(71) Applicant: Rockwell Automation Technologies, Inc., Mayfield Heights, OH (US)

(72) Inventors: Ashish Anand, Mayfield Heights, OH (US); Sharon Billi-Duran, Euclid, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 5 days.

(21) Appl. No.: 16/427,035

(22) Filed: May 30, 2019

(65) Prior Publication Data

US 2019/0377315 A1 Dec. 12, 2019

Related U.S. Application Data

(60) Provisional application No. 62/682,463, filed on Jun. 8, 2018.

(51) Int. Cl.
*G05B 19/05* (2006.01)

(52) U.S. Cl.
CPC ......... *G05B 19/058* (2013.01); *G05B 19/054* (2013.01); *G05B 19/056* (2013.01); *G05B 2219/13144* (2013.01); *G05B 2219/14005* (2013.01)

(58) Field of Classification Search
CPC .. G05B 19/042; G05B 19/054; G05B 19/056; G05B 19/058; G05B 2219/13144; G05B 2219/14005; G05B 2219/23258; G06F 16/2428; G06F 16/248; G06F 8/34
See application file for complete search history.

(56) References Cited

U.S. PATENT DOCUMENTS

| | | | |
|---|---|---|---|
| 2002/0194190 A1 | 12/2002 | Shema et al. | |
| 2005/0155043 A1* | 7/2005 | Schulz | G05B 15/02 719/328 |
| 2006/0241793 A1* | 10/2006 | Skourup | G06F 3/04815 700/83 |
| 2009/0083843 A1* | 3/2009 | Wilkinson, Jr. | H04L 9/3234 726/9 |

(Continued)

FOREIGN PATENT DOCUMENTS

| | | |
|---|---|---|
| EP | 1906279 A2 | 4/2008 |
| EP | 2988276 A2 | 2/2016 |
| EP | 3076311 A1 | 5/2016 |

*Primary Examiner* — Kidest Bahta

(57) ABSTRACT

Techniques to facilitate device identification in a human machine interface (HMI) associated with an industrial automation environment are disclosed herein. In at least one implementation, the HMI is configured to display a plurality of graphical elements that represent one or more industrial devices. A user query selection of at least one query-building element is received. One or more of the graphical elements in the HMI that represent the one or more industrial devices that correlate to the at least one query-building element is identified. The one or more of the graphical elements that correlate to the at least one query-building element is visually distinguished distinctly from a remainder of the graphical elements that do not correlate to the at least one query-building element.

20 Claims, 8 Drawing Sheets

(56) References Cited

U.S. PATENT DOCUMENTS

| | | | | |
|---|---|---|---|---|
| 2012/0110489 A1* | 5/2012 | Huttelmaier | .......... | G06F 3/0481 |
| | | | | 715/771 |
| 2015/0106753 A1* | 4/2015 | Tran | .................. | G05B 23/0272 |
| | | | | 715/765 |
| 2016/0299496 A1* | 10/2016 | Reichard | .............. | G05B 19/042 |
| 2016/0349967 A1* | 12/2016 | Ericsson | ............. | G06F 3/04842 |
| 2017/0103239 A1* | 4/2017 | DeYoung | ............. | G05B 19/418 |

\* cited by examiner

SCALABLE INTELLIGENT QUERY-BASED INTERFACE TO NAVIGATE AND FIND INDUSTRIAL INFORMATION ON A VISUAL INTERFACE

RELATED APPLICATIONS

This application claims the benefit of, and priority to, U.S. Provisional Patent Application No. 62/682,463, entitled "SCALABLE INTELLIGENT QUERY BASED INTERFACE TO NAVIGATE/FIND INDUSTRIAL INFORMATION ON A CANVAS/VISUAL INTERFACE", filed Jun. 8, 2018, which is hereby incorporated by reference in its entirety for all purposes.

TECHNICAL FIELD

Aspects of the disclosure are related to computing hardware and software technology, and in particular to industrial automation applications.

TECHNICAL BACKGROUND

Software applications that run on computing systems commonly provide some type of user client interface to present information to the user and receive user inputs. In a typical client-server architecture, an application running on a client computing system receives data transmitted from a server over a communication network for display to the user on the user client interface.

Industrial automation environments utilize machines and other devices during the industrial manufacturing process. These machines typically have various moving parts and other components that continually produce operational data over time, such as pressure, temperature, speed, and other metrics. Reviewing and monitoring this operational data is of high importance to those involved in operating an industrial enterprise.

The number of components in an industrial automation environment can range from a few devices to thousands of devices or more. An industrial control human machine interface (HMI) tasked to display the control system and the relationships and interactions between the various devices can be quite complex. Identifying any one device or type of device for further scrutiny can be a difficult and time-consuming process. Accordingly, it would be desirable to have a system and/or method of simplifying identification of devices within the HMI that a user wishes to review.

Overview

Techniques to facilitate device identification in a human machine interface (HMI) associated with an industrial automation environment are disclosed herein. In at least one implementation, one or more non-transitory computer-readable storage media having program instructions stored thereon to facilitate device identification in an HMI associated with an industrial automation environment are disclosed, wherein the HMI is configured to display a plurality of graphical elements that represent one or more industrial devices. The program instructions, when executed by a computing system, direct the computing system to at least receive a user query selection of at least one query-building element. The program instructions further direct the computing system to identify one or more of the graphical elements in the HMI that represent the one or more industrial devices that correlate to the at least one query-building element. The program instructions further direct the computing system to visually distinguish the one or more of the graphical elements that correlate to the at least one query-building element distinctly from a remainder of the graphical elements that do not correlate to the at least one query-building element.

In at least one implementation, a method to facilitate device identification in an HMI associated with an industrial automation environment is disclosed, wherein the HMI is configured to display a plurality of graphical elements that represent one or more industrial devices. The method at least comprises receiving a user query selection of at least one query-building element and identifying one or more of the graphical elements in the HMI that represent the one or more industrial devices that correlate to the at least one query-building element. The method further comprises visually distinguishing the one or more of the graphical elements that correlate to the at least one query-building element distinctly from a remainder of the graphical elements that do not correlate to the at least one query-building element.

In at least one implementation, an apparatus to facilitate device identification in an HMI associated with an industrial automation environment is disclosed, wherein the HMI is configured to display a plurality of graphical elements that represent one or more industrial devices. The apparatus at least comprises one or more computer-readable storage media and program instructions stored on the one or more computer-readable storage media. The program instructions, when executed by a processing system, direct the processing system to at least receive a user query selection of at least one query-building element. The program instructions further direct the processing system to identify one or more of the graphical elements in the HMI that represent the one or more industrial devices that correlate to the at least one query-building element. The program instructions further direct the processing system to visually distinguish the one or more of the graphical elements that correlate to the at least one query-building element distinctly from a remainder of the graphical elements that do not correlate to the at least one query-building element.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Embodiments of the invention allow an industrial user to easily navigate and find information on a complex visual layout.

Figure 1:
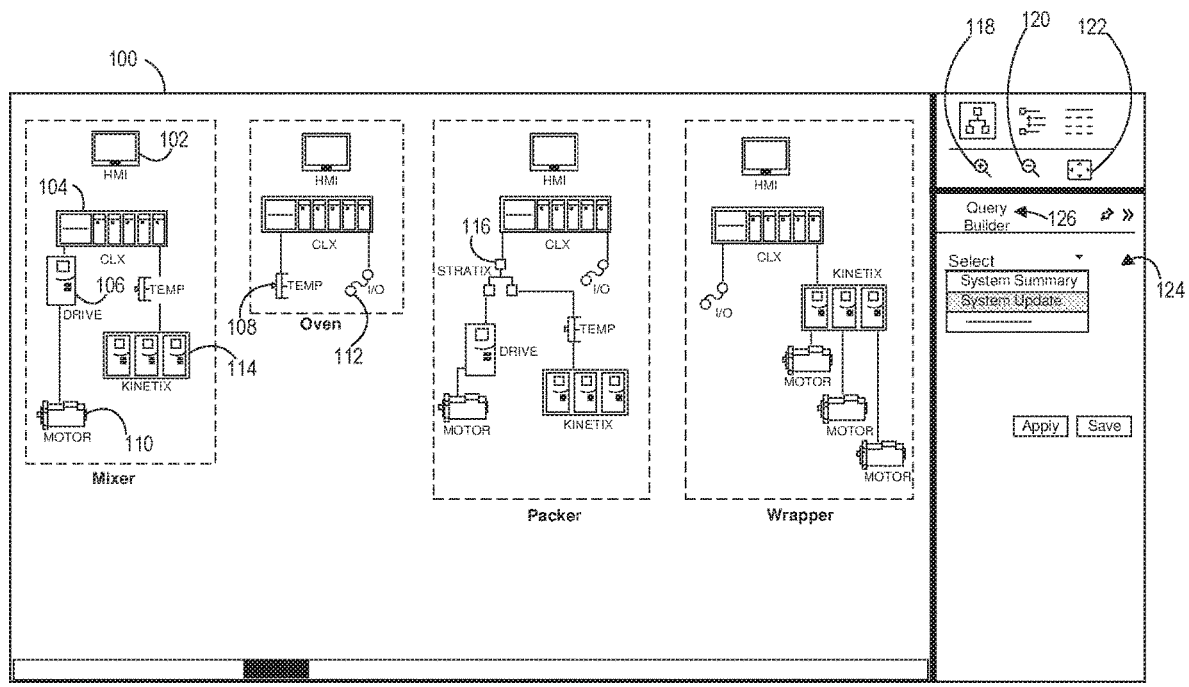
FIG. 1 is a block diagram that illustrates a visual implementation of an industrial system in an exemplary implementation.

FIG. 1 is a block diagram that illustrates a visual implementation 100 of an industrial system in an exemplary implementation. The industrial system could comprise any industrial automation environment, such as an automobile manufacturing factory, food processing plant, drilling operation, microprocessor fabrication facility, or some other type of industrial enterprise. The visual implementation 100 may be rendered as a graphical user interface (GUI) on any visual display device such as a workstation monitor or mobile device display screen, for example. Several exemplary industrial devices of the industrial system are graphically illustrated using graphical objects displayed in visual implementation 100. The industrial system devices illustrated include one or more of each of human machine interfaces (HMI) 102, industrial controllers (CLX) 104, drives 106, temperature sensors 108, motors 110, Input/Output (I/O) devices 112, Kinetix motion control systems 114, and industrially-managed Ethernet switch (Stratix) devices 116. In some examples, industrial controllers 104 could comprise ControlLogix® control systems provided by Rockwell Automation, Inc. Other types of industrial automation devices known in the industry such as pumps, actuators, filters, drills, robots, mills, printers, fabrication machinery, brew kettles, reserves of coal or other resources, or any other industrial automation equipment or element that may reside in an industrial automation environment are also contemplated as being graphically shown in the visual implementation 100 as needed when they are included in the industrial system.

As shown in FIG. 1, visual implementation 100 may graphically display many components of a large and complex industrial system. The display may include controls to zoom in 118 and zoom out 120 and a navigation control 122 for controlling the size and amount of display objects in the visual implementation 100.

An object identification tool 124 located adjacently to the visual implementation 100 of the industrial system allows a user to select one or more industrial devices in the visual implementation 100 based on user criteria or selections designed to pinpoint or narrow the number of graphical devices shown based on one or more categories. Object identification tool 124 includes a query builder tool 126 that provides user-selectable fields or categories that the user may select in order to identify and/or distinguish desired system devices from the remaining devices. As shown in FIG. 1, in one example, the query builder tool 126 allows the user to select between a System Summary option and a System Update option depending on the user's desire to show a system summary of a certain type or category of system devices or the user's desire to show devices in the system that need updates. Other query criteria are also contemplated herein to allow a user to choose the type of filter to apply to the graphical view.

Figure 2:
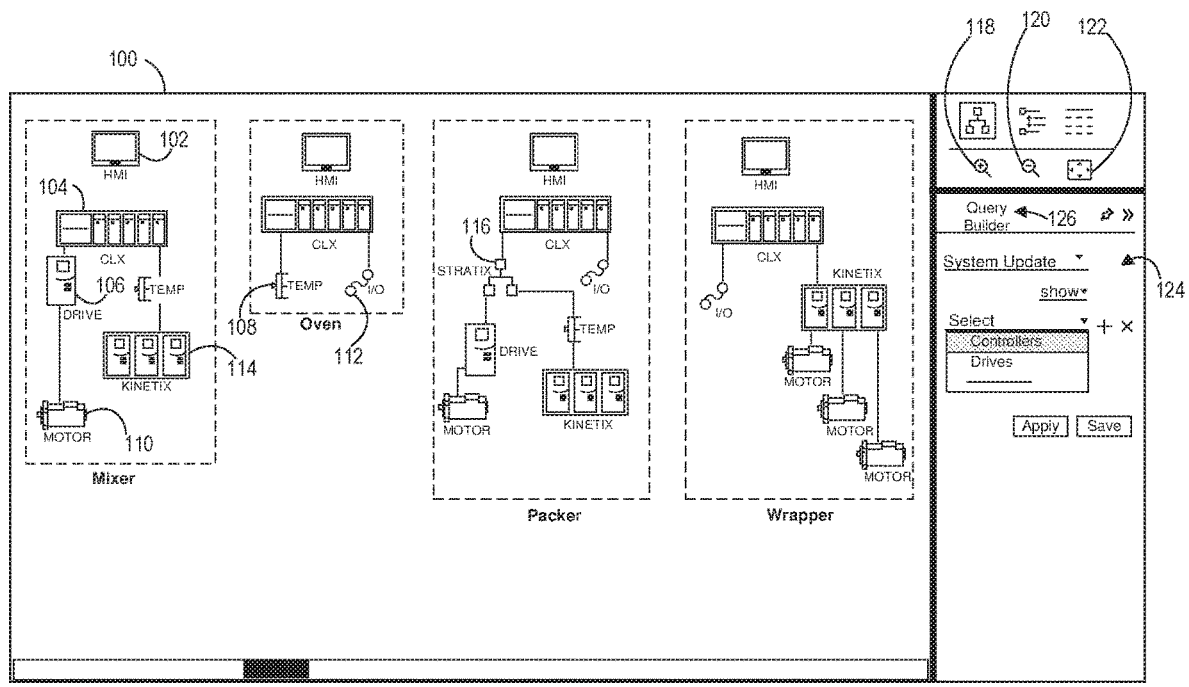
FIG. 2 is a block diagram that illustrates a visual implementation of an industrial system in an exemplary implementation.

FIG. 2 illustrates an intermediate step after user selection of the System Update option described above with respect to FIG. 1. Based on the selection of the System Update option, the query builder tool 126 allows the user to select the type of automation device for which the user desires to view additional "System Update" information. As shown in FIG. 2, one example provides that query builder tool 126 allows the user to select between controllers and drives. It is contemplated, however, that the user selection list may allow the user to select from any components or devices used in an industrial automation system, including those illustrated in the visual implementation 100 such as motors, sensors, I/O devices, displays and the like. In at least one implementation, multiple types of automation devices may be selected simultaneously. The object identification tool 124 allows the selected objects to be shown with distinctive graphics or visual effects, to be excluded from the visual implementation 100, and any other display properties.

Figure 3:
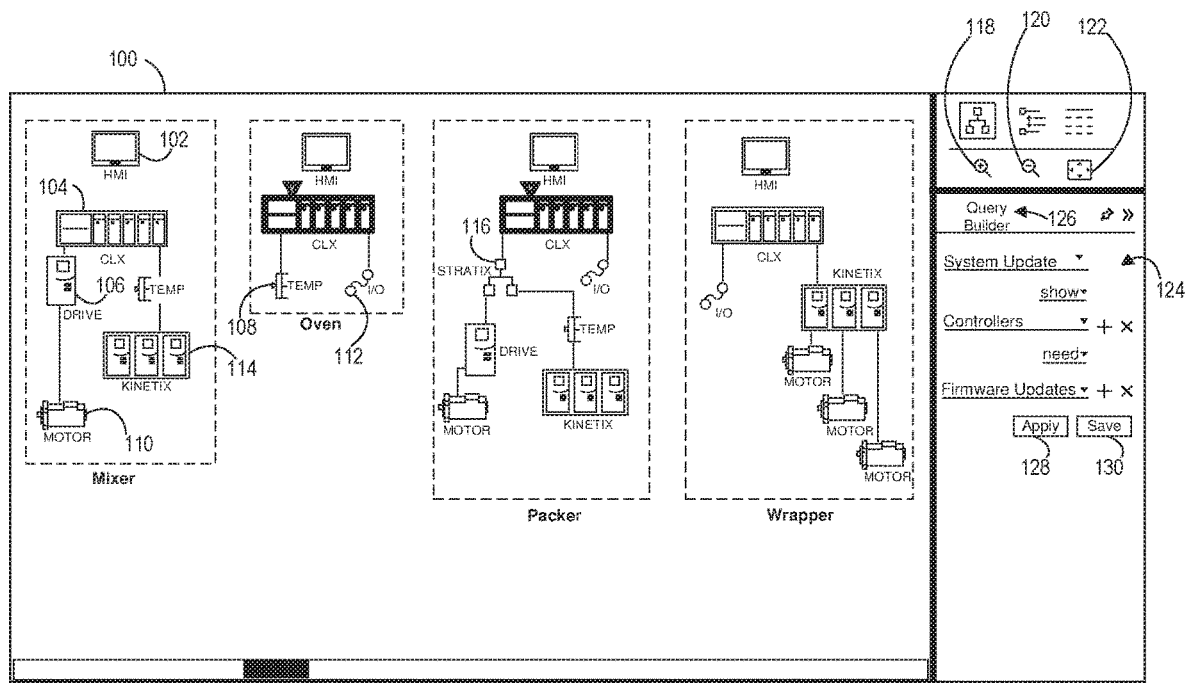
FIG. 3 is a block diagram that illustrates a visual implementation of an industrial system in an exemplary implementation.

FIG. 3 illustrates a final step after user selection of desired query parameters as described above with respect to FIG. 2. As shown in FIG. 3, the query of a system update showing controllers that need firmware updates is illustrated. If desired, the object identification tool 124 further allows the selected objects to be shown that need maintenance, replacement, power cycling, and the like. Alternatively, the selected objects may be queried to indicate those that do not require updates, or that have or do not have any other criteria as desired. In one implementation, the options selected in the query builder tool 126 are applied after the user selects the Apply button 128. In this manner, the query selections are used to identify the graphical objects of visual implementation 100 that match the query criteria, and visual implementation 100 is updated accordingly. If the user wishes to save the query for later use, the user may select the Save button 130 to save the user query selection to computer-readable storage.

As illustrated in FIG. 3, controllers 104 that need firmware updates per the options selected in the query builder tool 126 are identified and visually distinguished from the remainder of the graphical objects/devices illustrated in the visual implementation 100. As shown in the "Oven" and "Packer" systems, two of the controllers are visually distinguished by being highlighted in a darker/heavier line style. However, other types of visual distinguishing such as shading, coloring, opacity, bold lettering, italicizing, underlining, highlighting, reference lines, arrows, and other graphical properties are contemplated for visually distinguishing the identified devices from the rest. By visually distinguishing the graphical objects that match the query selections from the remainder of the objects, a user may more quickly identify the desired industrial automation objects. As such, the user may spend less time searching a complex system for devices that need attention or that have other needed information.

Figure 4:
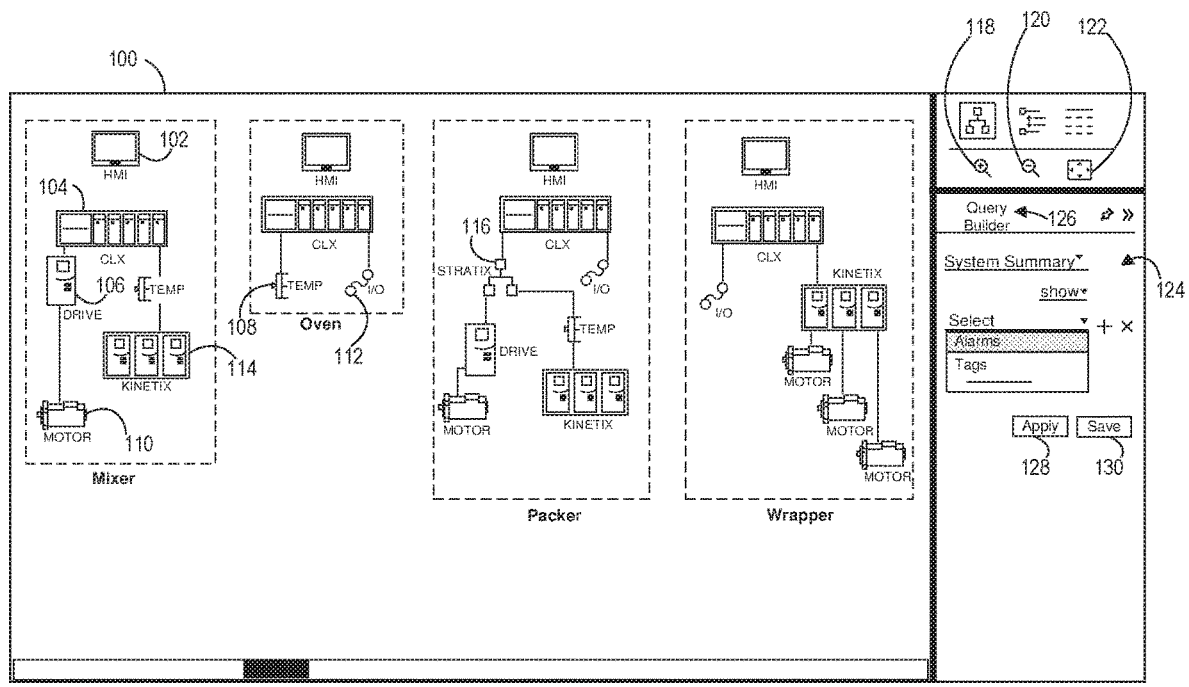
FIG. 4 is a block diagram that illustrates a visual implementation of an industrial system in an exemplary implementation.
Figure 5:
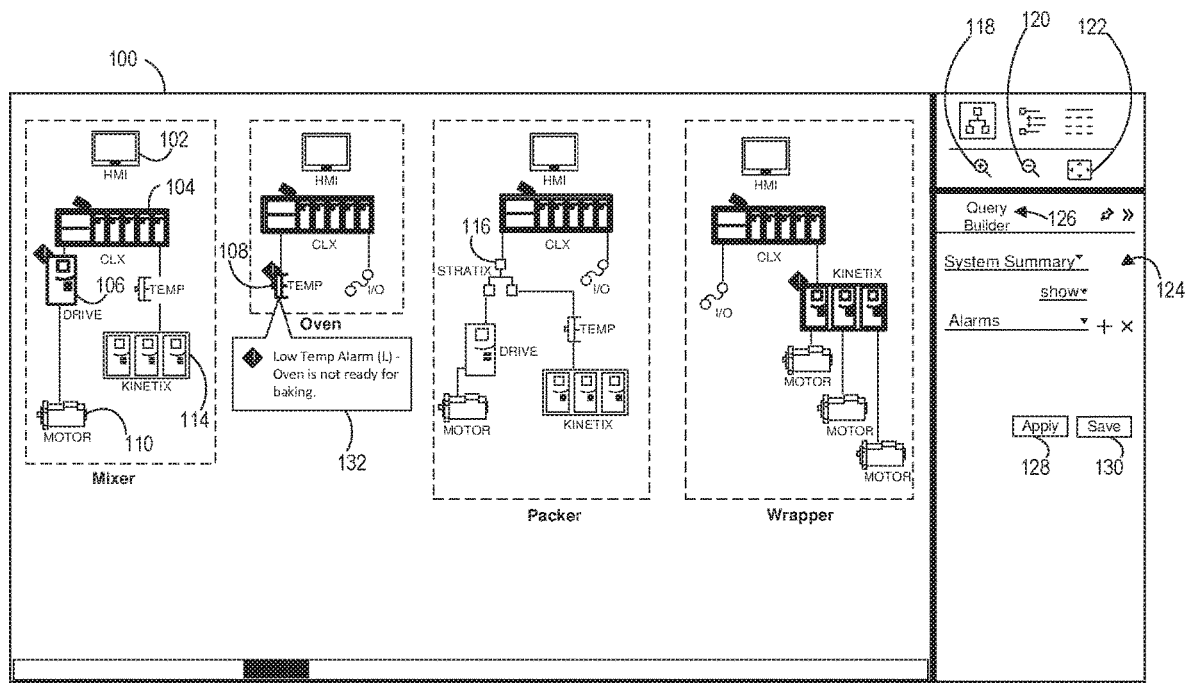
FIG. 5 is a block diagram that illustrates a visual implementation of an industrial system in an exemplary implementation.

FIG. 4 illustrates an intermediate step after user selection of the System Summary option described above with respect to FIG. 1. Responsive to selection of the System Summary option, the query builder tool 126 allows the user to select from a list of available system properties for which the user desires to view additional "System Summary" information. For example, options are provided to allow the user to select Alarms, Tags, or system summary information. In at least one implementation, multiple system information properties may be selected simultaneously. Upon selection of one or more system summary information items, the query is processed to identify one or more industrial devices that correlate to the queried information, and to identify and visually distinguish one or more graphical elements in the visual implementation 100 that represent the one or more industrial devices identified. For example, as illustrated in FIG. 5, user selection of the Alarms option together with selection of the Apply button 128 results in the visual implementation 100 visually distinguishing the automation devices associated with alarms (e.g., shading, coloring, opacity, heavier/bolder lines, and the like as described above) from the remaining other graphical representations of devices that do not currently have alarms. In this example, the controller 104 and the drive 106 of the Mixer system are highlighted, the controller 104 and the temperature sensor 108 of the Oven system are highlighted, the controller 104 of the Packer system is highlighted, and the controller 104 and the Kinetix motion control system 114 of the Wrapper system are highlighted to indicate that these devices are associated with alarms.

The visual implementation 100 may also provide the user with information related to the alarm of any one of the identified industrial devices such as, for example, by selecting or otherwise indicating one of the identified devices, such as by hovering a cursor over one of the identified devices, to display the text of the alarm associated therewith. For example, as shown in FIG. 5, an alarm notification box 132 provides further information regarding the alarm for the selected temperature sensor 108 of the Oven system. User interaction with the other distinguished graphical objects in the visual implementation 100 may reveal the text or other information related to the other identified devices as well.

Figure 6:
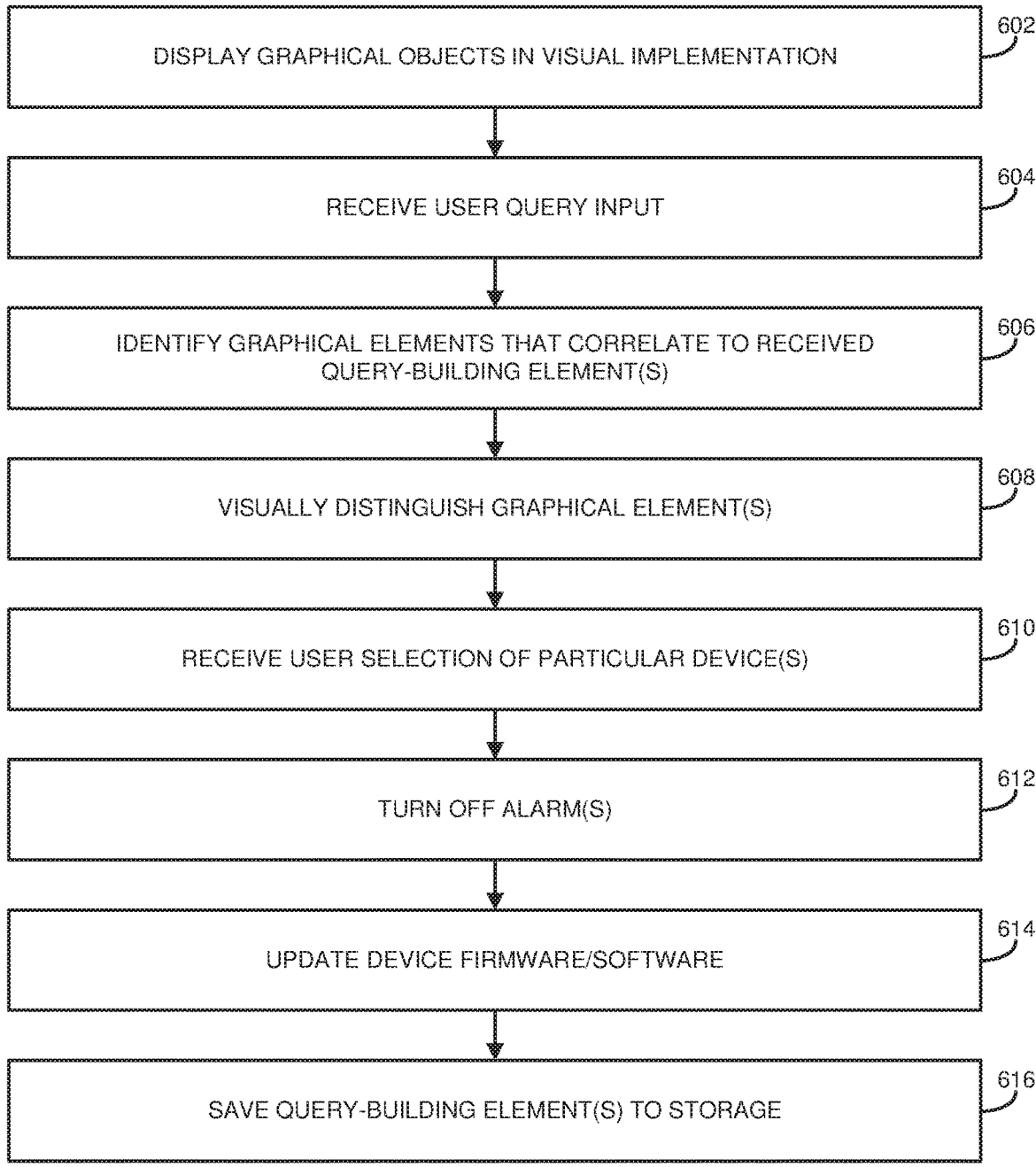
FIG. 6 is a flowchart that illustrates a query operation in an exemplary implementation.

FIG. 6 is a flow diagram that illustrates an operation 600 of a computing system in an exemplary implementation. The operation 600 shown in FIG. 6 may also be referred to as query operation process 600 herein. The following discussion of operation 600 will proceed with reference to visual implementation 100 of FIG. 1 in order to illustrate its operations, but note that the details provided in FIG. 1 are merely exemplary and not intended to limit the scope of process 600 to the specific implementation shown in FIG. 1.

Operation 600 may be employed to operate a computing system to facilitate device identification in a human machine interface (HMI) associated with an industrial automation environment. In some embodiments, the industrial automation environment 700 and/or the computing system 800 described below with respect to FIGS. 7 and 8 include a processor or controller configured to perform the query operation process 600. Additionally, the following exemplary process 600 could be executed by computing systems and other elements used in the industrial system shown in visual implementation 100 described above with respect to FIG. 1 through FIG. 5, and the exemplary operations described in FIG. 1 through FIG. 5 could also be combined with operation 600 in some implementations.

As shown in the operational flow of query operation process 600, at step 602 graphical objects of an industrial automation system are displayed in a visual implementation on a visual display device. For example, the graphical objects of the industrial automation system may be rendered as a graphical user interface (GUI) on any visual display device, such as a workstation monitor or mobile device display screen. In at least one implementation, an HMI associated with an industrial automation environment HMI is configured to display a plurality of graphical elements that represent one or more industrial devices. The graphical objects may be associated with industrial automation equipment and devices such as controllers, drives, sensors, motors, input/output (I/O) devices, motion control systems, switch devices, pumps, actuators, and the like.

At step 604, a user query selection is received of at least one query-building element. In one example, the query-building element could comprise a system summary element, a system update element, or any other informational query element, including combinations thereof. The system summary element may be used to identify parameters within the industrial devices of the industrial automation system relating to, for example, alarms, flags, tags, operational status, and the like. The system update element may be used to identify parameters within the industrial devices of the industrial automation system relating to, for example, firmware updates, software updates, hardware updates, maintenance tasks, and the like. Other query elements are possible and within the scope of this disclosure.

Based on receiving the user query selection, at step 606 any of the graphical elements in the display that represent corresponding industrial devices in the system that correlate to the query-building element(s) are identified. For example, in at least one implementation, process 600 may identify one or more of the graphical elements in the HMI that represent the one or more industrial devices that correlate to the at least one query-building element. In some implementations, the system may identify these graphical elements by determining which of the industrial devices have properties that match the at least one query-building element, and then identifying the graphical elements that represent the matching industrial devices.

After the graphical elements have been identified, at step 608 the identified graphical elements are visually distinguished in the display from the other graphical elements that do not correspond with the query-building element(s) so that a user may more easily identify the distinguished graphical elements within a complex system display. For example, in at least one implementation, process 600 may visually distinguish the one or more of the graphical elements that correlate to the at least one query-building element distinctly from a remainder of the graphical elements that do not correlate to the at least one query-building element. In some implementations, the identified graphical elements may be visually distinguished from other elements by modifying properties of the identified graphical elements such as color, darker/heavier line style, line size or thickness, object size, shading, coloring, opacity, bold lettering, italicizing, underlining, highlighting, circling, reference lines, arrows, blinking/flashing, and any other graphical display properties or other visual display techniques that may be used to emphasize or differentiate the identified graphical elements from the other graphical elements that do not corresponding with the query-building element(s). Additionally or alternatively, in some implementations, the identified graphical elements may be visually distinguished from the remainder of the graphical elements that do not correlate to the query-building element by de-emphasizing these other elements, such as by reducing the brightness, contrast, color saturation, opacity, or any other visual properties of the remaining elements that were not identified in order to a create a grayed-out effect on these elements, thereby accentuating and visually distinguishing the identified graphical elements that do correlate to the at least one query-building element.

In at least one implementation, a user selection of a graphical element that represents one of the industrial devices visually distinguished in the HMI may be received, and responsive to the user selection, an alarm associated with the industrial device represented by the user-selected graphical element may be turned off. For example, based on a user query selection comprising instructions to visually distinguish graphical elements that represent industrial devices with active alarms, the display may be updated to include one or more icons, pictures, or the like configured to indicate an alarm status positioned adjacently to the visually-distinguished graphical elements associated with the alarm to allow the user to visually detect the type of alarm present in the related industrial devices. Through interaction with the display or interaction with other HMI elements, the query operation process 600 may receive a user selection of a particular device or devices at step 610, and in response to the user selection, the alarm(s) within the particular device (s) may be turned off, reset, or the like at step 612 so that the user or other technician can address the alarm status remotely within being physically proximate to the device. The alarm addressed in this manner may include an audible alarm or a visual alarm in some implementations.

In at least one implementation, a user selection of a graphical element that represents one of the industrial devices visually distinguished in the HMI may be received, and responsive to the user selection, firmware in the industrial device represented by the user-selected graphical element may be installed or updated. For example, based on a user query selection comprising instructions to visually distinguish graphical elements that represent industrial devices that require firmware or software updates, query operation process 600 may install the firmware or software updates in the corresponding industrial devices at step 614 in response to receiving the user selection of a particular device or devices at step 610.

At step 616, query operation process 600 may receive a user command to save the one or more query-building elements to computer-readable storage for later retrieval and application.

Advantageously, by utilizing the query operation process 600 described herein, a user can better identify particular devices or types of devices in an HMI of an industrial control system for further scrutiny and analysis. In addition, the user can then filter the identified devices to view and take action on associated alarms, necessary updates, scheduled maintenance, and any other desired system tasks. Accordingly, the techniques disclosed herein greatly facilitate the identification of devices and desired system information within an HMI.

Figure 7:
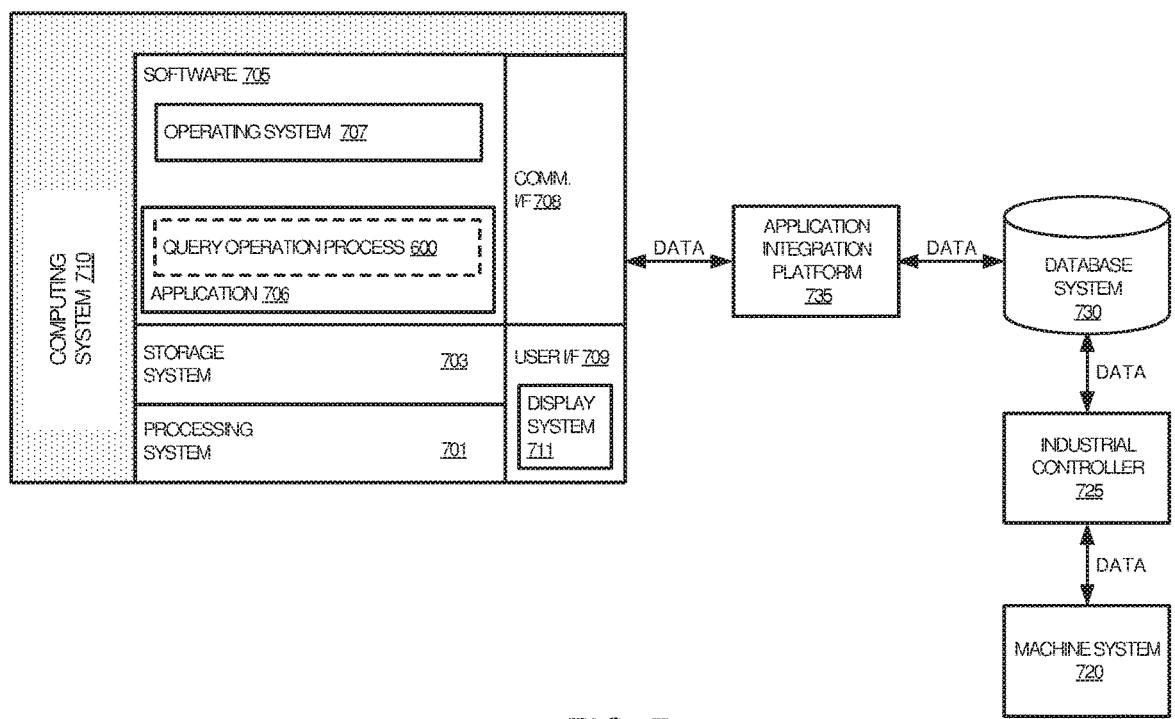
FIG. 7 is a block diagram that illustrates an operational scenario involving a computing system in an industrial automation environment in an exemplary implementation.

Turning now to FIG. 7, a block diagram that illustrates an industrial automation environment 700 in an exemplary implementation is shown. Industrial automation environment 700 provides an example of an industrial automation environment that may be utilized to implement the query operation processes disclosed herein, but other environments could also be used. Industrial automation environment 700 includes computing system 710, machine system 720, industrial controller 725, database system 730, and application integration platform 735. Machine system 720 and controller 725 are in communication over a communication link, controller 725 and database system 730 communicate over a communication link, database system 730 and application integration platform 735 communicate over a communication link, and application integration platform 735 and computing system 710 are in communication over a communication link. Note that there would typically be many more machine systems in most industrial automation environments, but the number of machine systems shown in FIG. 7 has been restricted for clarity.

Industrial automation environment 700 comprises an automobile manufacturing factory, food processing plant, oil drilling operation, microprocessor fabrication facility, or some other type of industrial enterprise. Machine system 720 could comprise a sensor, drive, pump, filter, drill, motor, robot, fabrication machinery, mill, printer, or any other industrial automation equipment, including their associated control systems. A control system comprises, for example, industrial controller 725, which could include automation controllers, programmable logic controllers (PLCs), programmable automation controllers (PACs), or any other controllers used in automation control. Additionally, machine system 720 could comprise other industrial equipment, such as a brew kettle in a brewery, a reserve of coal or other resources, or any other element that may reside in an industrial automation environment 700.

Machine system 720 continually produces operational data over time. The operational data indicates the current status of machine system 720, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 720 and/or controller 725 is capable of transferring the operational data over a communication link to database system 730, application integration platform 735, and computing system 710, typically via a communication network. Database system 730 could comprise a disk, tape, integrated circuit, server, or some other memory device. Database system 730 may reside in a single device or may be distributed among multiple memory devices.

Application integration platform 735 comprises a processing system and a communication transceiver. Application integration platform 735 may also include other components such as a router, server, data storage system, and power supply. Application integration platform 735 may reside in a single device or may be distributed across multiple devices. Application integration platform 735 may be a discrete system or may be integrated within other systems—including other systems within industrial automation environment 700. In some examples, application integration platform 735 could comprise a FactoryTalk® VantagePoint server system provided by Rockwell Automation, Inc.

The communication links over which data is exchanged between machine system 720, industrial controller 725, database system 730, application integration platform 735, and communication interface 708 of computing system 710 could use metal, air, space, optical fiber such as glass or plastic, or some other material as the transport medium, including combinations thereof. The communication links could comprise multiple network elements such as routers, gateways, telecommunication switches, servers, processing systems, or other communication equipment and systems for providing communication and data services. These communication links could use various communication protocols, such as time-division multiplexing (TDM), Internet Protocol (IP), Ethernet, telephony, optical networking, packet networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 710 may be representative of any computing apparatus, system, or systems on which the query operation processes disclosed herein, or variations thereof may be suitably implemented. Computing system 710 provides an example of a computing system that could be used as either a server or a client device in some implementations, although such devices could have alternative configurations. Examples of computing system 710 include mobile computing devices, such as cell phones, tablet computers, laptop computers, notebook computers, and gaming devices, as well as any other type of mobile computing devices and any combination or variation thereof. Examples of computing system 710 also include desktop computers, server computers, and virtual machines, as well as any other type of computing system, variation, or combination thereof. In some implementations, computing system 710 could comprise a mobile device capable of operating in a server-like fashion which, among other uses, could be utilized in a wireless mesh network.

Computing system 710 includes processing system 701, storage system 703, software 705, communication interface 708, and user interface 709. Processing system 701 is operatively coupled with storage system 703, communication interface 708, and user interface 709. Processing system 701 loads and executes software 705 from storage system 703. Software 705 includes application 706 and operating system 707. Application 706 may include query operation process 600 in some examples, as indicated by the dashed line in FIG. 7. When executed by computing system 710 in general, and processing system 701 in particular, software 705 directs computing system 710 to operate as described herein for query operation process 600 or variations thereof. In this example, user interface 709 includes display system 711, which itself may be part of a touch screen that also accepts user inputs via touches on its surface. Computing system 710 may optionally include additional devices, features, or functionality not discussed here for purposes of brevity.

Figure 8:
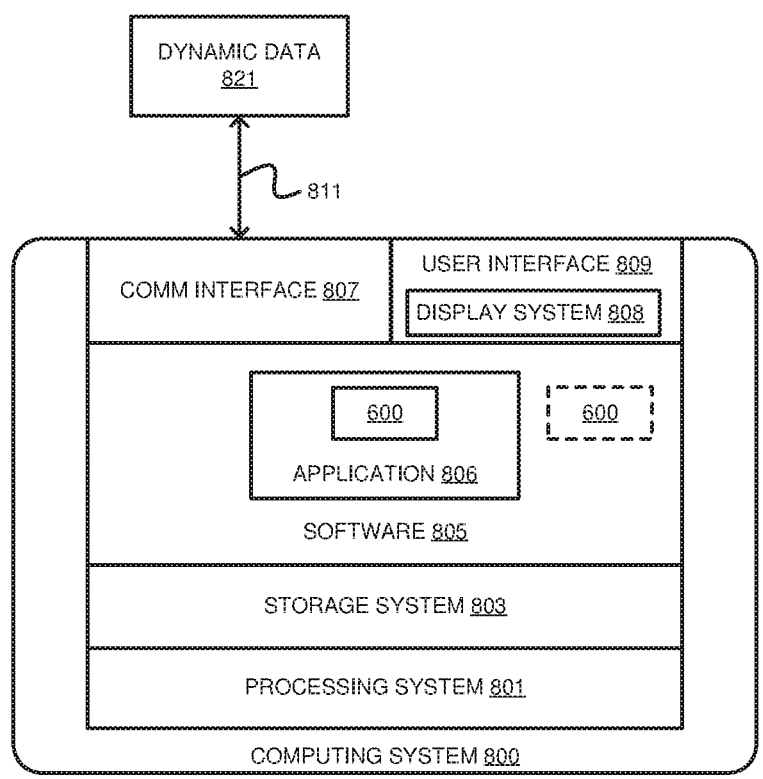
FIG. 8 is a block diagram that illustrates a computing system in an exemplary implementation.

Turning now to FIG. 8, a block diagram is shown that illustrates computing system 800 in an exemplary implementation. Computing system 800 provides an example of any computing system that may be used to execute query operation process 600 or variations thereof, although such systems could use alternative configurations. Computing system 800 includes processing system 801, storage system 803, software 805, communication interface 807, and user interface 809. User interface 809 comprises display system 808. Software 805 includes application 806 which itself includes query operation process 600. Query operation process 600 may optionally be implemented separately from application 806, as indicated by the dashed lines surrounding process 600 in FIG. 8.

Computing system 800 may be representative of any computing apparatus, system, or systems on which application 806 and query operation process 600 or variations thereof may be suitably implemented. Examples of computing system 800 include mobile computing devices, such as cell phones, tablet computers, laptop computers, notebook computers, and gaming devices, as well as any other type of mobile computing devices and any combination or variation thereof. Note that the features and functionality of computing system 800 may apply as well to desktop computers, server computers, and virtual machines, as well as any other type of computing system, variation, or combination thereof.

Computing system 800 includes processing system 801, storage system 803, software 805, communication interface 807, and user interface 809. Processing system 801 is operatively coupled with storage system 803, communication interface 807, and user interface 809. Processing system 801 loads and executes software 805 from storage system 803. When executed by computing system 800 in general, and processing system 801 in particular, software 805 directs computing system 800 to operate as described herein for query operation process 600 or variations thereof. Computing system 800 may optionally include additional devices, features, or functionality not discussed herein for purposes of brevity.

Referring still to FIG. 8, processing system 801 may comprise a microprocessor and other circuitry that retrieves and executes software 805 from storage system 803. Processing system 801 may be implemented within a single processing device but may also be distributed across multiple processing devices or sub-systems that cooperate in executing program instructions. Examples of processing system 801 include general purpose central processing units, application specific processors, and logic devices, as well as any other type of processing device, combinations, or variations thereof.

Storage system 803 may comprise any computer-readable storage media capable of storing software 805 and readable by processing system 801. Storage system 803 may include volatile and nonvolatile, removable and non-removable media implemented in any method or technology for storage of information, such as computer-readable instructions, data structures, program modules, or other data. Storage system 803 may be implemented as a single storage device but may also be implemented across multiple storage devices or subsystems co-located or distributed relative to each other. Storage system 803 may comprise additional elements, such as a controller, capable of communicating with processing system 801. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, in conjunction with user interface 809, processing system 801 loads and executes portions of software 805, such as query operation process 600, to render a graphical user interface for application 806 for display by display system 808 of user interface 809. Software 805 may be implemented in program instructions and among other functions may, when executed by computing system 800 in general or processing system 801 in particular, direct computing system 800 or processing system 801 to receive a user query selection of at least one query-building element, wherein a human machine interface (HMI) associated with an industrial automation environment is configured to display a plurality of graphical elements that represent one or more industrial devices. Software 805 may further direct computing system 800 or processing system 801 to identify one or more of the graphical elements in the HMI that represent the one or more industrial devices that correlate to the at least one query-building element. Software 805 may further direct computing system 800 or processing system 801 to visually distinguish the one or more of the graphical elements that correlate to the at least one query-building element distinctly from a remainder of the graphical elements that do not correlate to the at least one query-building element.

Software 805 may include additional processes, programs, or components, such as operating system software or other application software. Examples of operating systems include Windows, iOS, and Android, as well as any other suitable operating system. Software 805 may also comprise firmware or some other form of machine-readable processing instructions executable by processing system 801.

In general, software 805 may, when loaded into processing system 801 and executed, transform computing system 800 overall from a general-purpose computing system into a special-purpose computing system customized to facilitate device identification in an HMI associated with an industrial automation environment as described herein for each implementation. For example, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage.

In some examples, if the computer-storage media are implemented as semiconductor-based memory, software 805 may transform the physical state of the semiconductor memory when the program is encoded therein. For example, software 805 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 800 is generally intended to represent a computing system with which software 805 is deployed and executed in order to implement application 806 and/or query operation process 600 (and variations thereof). However, computing system 800 may also represent any computing system on which software 805 may be staged and from where software 805 may be distributed, transported, downloaded, or otherwise provided to yet another computing system for deployment and execution, or yet additional distribution. For example, computing system 800 could be configured to deploy software 805 over the internet to one or more client computing systems for execution thereon, such as in a cloud-based deployment scenario.

Communication interface 807 may include communication connections and devices that allow for communication between computing system 800 and other computing systems (not shown) or services, over a communication network 811 or collection of networks. In some implementations, communication interface 807 receives dynamic data 821 over communication network 811. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 809 may include a voice input device, a touch input device for receiving a gesture from a user, a motion input device for detecting non-touch gestures and other motions by a user, and other comparable input devices and associated processing elements capable of receiving user input from a user. Output devices such as display system 808, speakers, haptic devices, and other types of output devices may also be included in user interface 809. The aforementioned user input devices are well known in the art and need not be discussed at length here. User interface 809 may also include associated user interface software executable by processing system 801 in support of the various user input and output devices discussed above. Separately or in conjunction with each other and other hardware and software elements, the user interface software and devices may provide a graphical user interface, a natural user interface, or any other kind of user interface. User interface 809 may be omitted in some implementations.

A technical effect provided by the technology disclosed herein includes the ability of an external device, in response to receiving a user input, to visually distinguish one or more graphical display objects based on one or more query criteria in a display, which allows the display to indicate which objects match the query criteria from other objects not matching the query criteria. A practical effect provided by the technology disclosed herein provides a user with a way of finding desired drawing objects on a visually crowded display that is faster than visually identifying desired drawing objects not visually distinguished from the other drawing objects on the display.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. One or more non-transitory computer-readable storage media having program instructions stored thereon to facilitate device identification in a human machine interface (HMI) associated with an industrial automation environment, wherein the HMI is configured to display a plurality of graphical elements, each of the graphical elements representing a corresponding industrial device of a plurality of industrial devices of the industrial automation environment, and wherein the program instructions, when executed by a computing system, direct the computing system to at least:
receive a user query selection of at least one query-building element;
identify one or more graphical elements of the plurality of graphical elements in the HMI that represent one or more corresponding industrial devices that correlate to the at least one query-building element; and
visually distinguish the one or more graphical elements that correlate to the at least one query-building element distinctly from a remainder of the graphical elements that do not correlate to the at least one query-building element by modifying graphical display properties of at least some of the plurality of graphical elements to visually emphasize the one or more graphical elements over the remainder of the graphical elements.

2. The one or more non-transitory computer-readable storage media of claim 1, wherein the program instructions further direct the computing system to display the plurality of graphical elements in the HMI.

3. The one or more non-transitory computer-readable storage media of claim 1, wherein the program instructions further direct the computing system to:
receive a user selection of a first graphical element of the one or more graphical elements; and
responsive to the user selection, install firmware in the corresponding industrial device represented by the first graphical element.

4. The one or more non-transitory computer-readable storage media of claim 1, wherein the program instructions further direct the computing system to:
receive a user selection of a first graphical element of the one or more graphical elements; and
responsive to the user selection, turn off an alarm associated with the corresponding industrial device represented by the first graphical element; and
wherein the alarm is one of an audible alarm and a visual alarm.

5. The one or more non-transitory computer-readable storage media of claim 1, wherein the graphical display properties comprise color, line style, line size, object size, shading, highlighting, or a combination thereof.

6. The one or more non-transitory computer-readable storage media of claim 1, wherein the plurality of industrial devices comprise a controller, a drive, a sensor, a motor, an input/output device, a motion control system, a switch device, a pump, an actuator, or a combination thereof.

7. The one or more non-transitory computer-readable storage media of claim 1, wherein the program instructions further direct the computing system to save the user query selection to computer-readable storage.

8. A method to facilitate device identification in a human machine interface (HMI) associated with an industrial automation environment, wherein the HMI is configured to display a plurality of graphical elements, each of the graphical elements representing a corresponding industrial device of a plurality of industrial devices of the industrial automation environment, the method comprising:
receiving a user query selection of at least one query-building element;
identifying one or more graphical elements of the plurality of graphical elements in the HMI that represent one or more corresponding industrial devices that correlate to the at least one query-building element; and
visually distinguishing the one or more graphical elements that correlate to the at least one query-building element distinctly from a remainder of the graphical elements that do not correlate to the at least one query-building element by modifying graphical display properties of at least some of the plurality of graphical elements to visually emphasize the one or more graphical elements over the remainder of the graphical elements.

9. The method of claim 8 further comprising displaying the plurality of graphical elements in the HMI.

10. The method of claim 8 further comprising:
receiving a user selection of a first graphical element of the one or more graphical elements; and
responsive to the user selection, installing firmware in the corresponding industrial device represented by the first graphical element.

11. The method of claim 8 further comprising:
receiving a user selection of a first graphical element of the one or more graphical elements; and
responsive to the user selection, turning off an alarm associated with the corresponding industrial device represented by the first graphical element; and
wherein the alarm is one of an audible alarm and a visual alarm.

12. The method of claim 8, wherein the graphical display properties comprise color, line style, line size, object size, shading, highlighting, or a combination thereof.

13. The method of claim 8, wherein the plurality of industrial devices comprise a controller, a drive, a sensor, a motor, an input/output device, a motion control system, a switch device, a pump, an actuator, or a combination thereof.

14. The method of claim 8 further comprising saving the user query selection to computer-readable storage.

15. An apparatus to facilitate device identification in a human machine interface (HMI) associated with an industrial automation environment, wherein the HMI is configured to display a plurality of graphical elements, each of the graphical elements representing a corresponding industrial device of a plurality of industrial devices of the industrial automation environment, the apparatus comprising:
one or more computer-readable storage media; and
program instructions stored on the one or more computer-readable storage media that,
when executed by a processing system, direct the processing system to at least:
receive a user query selection of at least one query-building element;
identify one or more graphical elements of the plurality of graphical elements in the HMI that represent one or more corresponding industrial devices that correlate to the at least one query-building element; and
visually distinguish the one or more graphical elements that correlate to the at least one query-building element distinctly from a remainder of the graphical elements that do not correlate to the at least one query-building element by modifying graphical display properties of at least some of the plurality of graphical elements to visually emphasize the one or more graphical elements over the remainder of the graphical elements.

16. The apparatus of claim 15, wherein the program instructions further direct the processing system to display the plurality of graphical elements in the HMI.

17. The apparatus of claim 15, wherein the program instructions further direct the processing system to:
   receive a user selection of a first graphical element of the one or more graphical elements; and
   responsive to the user selection, install firmware in the corresponding industrial device represented by the first graphical element.

18. The apparatus of claim 15, wherein the program instructions further direct the processing system to:
   receive a user selection of a first graphical element of the one or more graphical elements; and
   responsive to the user selection, turn off an alarm in the corresponding industrial device represented by the first graphical element; and
   wherein the alarm is one of an audible alarm and a visual alarm.

19. The apparatus of claim 15, wherein the graphical display properties comprise color, line style, line size, object size, shading, highlighting, or a combination thereof.

20. The apparatus of claim 15, wherein the plurality of industrial devices comprise a controller, a drive, a sensor, a motor, an input/output device, a motion control system, a switch device, a pump, an actuator, or a combination thereof.

\* \* \* \* \*